US008476185B2

(12) United States Patent
Chin et al.

(10) Patent No.: US 8,476,185 B2
(45) Date of Patent: Jul. 2, 2013

(54) APPARATUS AND METHOD FOR MANUFACTURING MANGANESE OXIDE-TITANIA CATALYST

(75) Inventors: Sung Min Chin, Uijeongbu-si (KR); Jong Soo Jurng, Seoul (KR); Gwi Nam Bae, Seoul (KR); Eun Seuk Park, Seongnam-si (KR); Min Su Kim, Jeonju-si (KR)

(73) Assignee: Korea Institute of Science and Technology (KR)

( * ) Notice: Subject to any disclaimer, the term of this patent is extended or adjusted under 35 U.S.C. 154(b) by 162 days.

(21) Appl. No.: 13/006,105

(22) Filed: Jan. 13, 2011

(65) Prior Publication Data

US 2012/0129691 A1     May 24, 2012

(30) Foreign Application Priority Data

Nov. 19, 2010    (KR) ........................ 10-2010-0115540

(51) Int. Cl.
*B01J 23/00*      (2006.01)
*B01J 21/00*      (2006.01)

(52) U.S. Cl.
USPC ......................................... 502/324; 502/350

(58) Field of Classification Search
USPC ................................................. 502/324, 350
See application file for complete search history.

(56) References Cited

U.S. PATENT DOCUMENTS

| 3,962,189 | A | * | 6/1976 | Russin et al. ................. 528/277 |
| 4,010,145 | A | * | 3/1977 | Russin et al. ................. 528/280 |
| 4,842,832 | A | * | 6/1989 | Inoue et al. .................. 423/21.1 |
| 4,871,709 | A |   | 10/1989 | Tatsushima et al. |
| 5,002,920 | A | * | 3/1991 | Yoshimoto et al. ........... 502/324 |
| 5,476,828 | A | * | 12/1995 | Kapteijn et al. .............. 502/324 |

(Continued)

FOREIGN PATENT DOCUMENTS

| JP | 51-71299 | 6/1976 |
| JP | 11-267526 | 5/1999 |
| KR | 10-0589203 | 6/2006 |
| KR | 100658113 | 12/2006 |

OTHER PUBLICATIONS

Xue, M., et al., "The direct synthesis of mesoporous structured MnO(2)/ TiO(2) nanocomposite: a novel visible-light active photocatalyst with large pore size", Nanotechnology, 2008, V.19, No. 18, pp. 185604.

*Primary Examiner* — Cam N. Nguyen
(74) *Attorney, Agent, or Firm* — Cantor Colburn LLP

(57) ABSTRACT

Disclosed are an apparatus and method for preparing a manganese oxide-titania catalyst. The apparatus for preparing a manganese oxide-titania catalyst includes: a vaporizer vaporizing a manganese precursor and a titanium precursor; a carrier gas supply line supplying a carrier gas, which carries precursor vapors vaporized by the vaporizer to a reactor, to the vaporizer; an oxygen supply line supplying an oxygen source to the reactor; the reactor reacting the precursor vapors with the oxygen source to synthesize a manganese oxide-titania catalyst; and a collector condensing and collecting the manganese oxide-titania catalyst synthesized in the reactor. And, the method for preparing a manganese oxide-titania catalyst includes: 1) vaporizing a manganese precursor and a titanium precursor; 2) carrying precursor vapors (vapors of the manganese precursor and the titanium precursor) and an oxygen source to a reactor; 3) reacting the precursor vapors and the oxygen source to synthesize a manganese oxide-titania catalyst; and 4) condensing and collecting the manganese oxide-titania catalyst. According to the present disclosure, mass production of manganese oxide-titania catalysts with high decomposition efficiency of organic compounds can be prepared through fewer and continuous processes.

18 Claims, 6 Drawing Sheets

U.S. PATENT DOCUMENTS

| | | | |
|---|---|---|---|
| 5,759,947 A * | 6/1998 | Zhou | 502/324 |
| 5,780,384 A * | 7/1998 | Tomczak et al. | 502/324 |
| 6,872,686 B2 * | 3/2005 | Allen et al. | 502/324 |
| 6,977,237 B2 * | 12/2005 | Geerlings et al. | 502/326 |
| 7,476,378 B2 * | 1/2009 | Subramanian et al. | 423/613 |
| 7,968,492 B2 * | 6/2011 | Augustine | 502/350 |

* cited by examiner

APPARATUS AND METHOD FOR MANUFACTURING MANGANESE OXIDE-TITANIA CATALYST

CROSS-REFERENCE TO RELATED APPLICATION

This application claims priority to Korean Patent Application No. 10-2010-0115540, filed on Nov. 19, 2010, and all the benefits accruing therefrom under 35 U.S.C. §119, the contents of which in its entirety are herein incorporated by reference.

BACKGROUND

1. Field

The present disclosure relates to an apparatus and a method for preparing a manganese oxide-titania catalyst. More particularly, the disclosure relates to an apparatus and a method for preparing a manganese oxide-titania catalyst by chemical vapor condensation (CVC), which allows mass production of the catalyst with reduced process stages and provides high decomposition efficiency of organic compounds.

2. Description of the Related Art

Volatile organic compounds (VOCs) have high vapor pressures and thus are easily evaporated into the atmosphere. In the atmosphere, they photochemically react with nitrogen oxides ($NO_x$) under sunlight to produce photochemical oxides such as ozone ($O_3$), which act as secondary pollutants. Furthermore, VOCs are harmful to the human health since a lot of carcinogenic chemicals are included and are the cause of ozone depletion, global warming, photochemical smog, offensive odor, or the like.

Benzene, a typical example of the VOCs, has serious effects on human health, including inactivation of the central nervous system and increased carcinogenic risks upon exposure for a long time. When test animals were exposed to benzene at high concentration for a long period of time, cancer was induced. It is known that a long-term exposure even at low concentration increases carcinogenic risks in human. Another typical example of the VOCs, toluene, is also known to negatively affect the central nervous system.

According to the data from the Ministry of Environment in 2000, about 700,000 tons of VOCs are emitted annually in Korea. Among them, the emission from the coating industry is the largest with about 52% of the total, the remaining mainly the automobiles, gas stations, printing factories, paint manufacturing, laundries, and so forth.

In general, VOCs are processed by direct combustion, adsorption, catalyzed oxidation, or the like.

Established in 1950s, the direct combustion method is a technique of burning VOCs using heat resulting from combustion of a fuel. Although the processing efficiency is high, the method is disadvantageous in that large amounts of nitrogen oxides ($NO_x$) are produced during the combustion at high temperature and the fuel costs a lot.

The adsorption method is a technique of physically and/or chemically adsorbing VOCs onto activated carbon and is frequently used for medium-to-low concentration emissions. However, since the activated carbon loses its processing efficiency after prolonged use, it has to be replaced frequently. As a result, installation and maintenance costs are high.

The catalyzed oxidation method is a technique of oxidizing VOCs using a catalyst prepared by dispersing precious metal such as platinum (Pt) or palladium (Pd) on a support such as alumina, cordierite or mullite. Although the catalyst life is fairly long, the precious metal such as Pt and Pd is expensive and the catalytic activity is lowered at high temperatures of 500° C. or above.

Recently, the manganese oxide catalyst having good oxidation reactivity is gaining attentions and technologies are being developed with regard thereto. Manganese oxide is widely known as a catalyst that decomposes ozone.

Since the oxygen radical (O*) produced during the decomposition of ozone has excellent oxidation reactivity, the catalyst is utilized in various oxidation reactions. Among the manganese oxide catalysts, manganese dioxide ($MnO_2$) is known to have the best ozone decomposing ability.

For example, U.S. Pat. No. 4,871,709 (Prior Patent Document 1) describes that manganese oxide has been well known as an ozone cracking catalyst and proposes a method for preparing the manganese oxide catalyst. And, Japanese Patent Publication No. S51-71299 (Prior Patent Document 2) discloses a method of preparing activated manganese dioxide by adding potassium permanganate to an acidic aqueous solution of manganese salt and aging the solution.

In addition to the function as the ozone cracking catalyst, manganese oxide is also known to have superior ability of decomposing VOCs. Usually, manganese oxide is supported on a support such as ceramic to be used as a catalyst for decomposing ozone or organic compounds. For example, Prior Patent Document 1 describes dipping a ceramic fiber aggregate in a solution of manganese nitrate, contacting the dipped aggregate with an ammonia gas stream to convert $Mn(NO_3)_2$ into $Mn(OH)_2$, and then drying and calcining the resultant aggregate in the air.

As described, ceramic is mainly used as the support of manganese oxide. Recently, titania ($TiO_2$) is preferred among the ceramic materials. With good interactivity with manganese oxide and superior adsorption ability, titania is known to improve decomposition efficiency of organic compounds. For example, Korean Patent No. 0589203 (Prior Patent Document 3) discloses manganese oxide-titania aerogel catalysts, a method for preparing the same and oxidative destruction of chlorinated aromatic compounds using the same.

At present, manganese oxide-titania catalysts are usually prepared by wet methods such as coprecipitation or impregnation. However, since the wet method requires a number of steps, including dissolution, evaporation, drying, pulverization and sintering, a long time is required for the preparation of the catalyst and application o mass production is difficult. Furthermore, the wet method does not provide high decomposition efficiency of organic compounds.

A method for preparing the manganese oxide-titania catalyst by aerogel synthesis has been proposed. That is, Prior Patent Document 3 discloses an aerogel synthesis method of preparing a gel by adding an acid catalyst to a solution of manganese oxide and an inorganic gel source as a precursor to titanium oxide, followed aging, solvent exchange, supercritical drying and heat treatment. However, the aerogel synthesis method is not practicable because it requires the gel aging process of days or more and the expensive supercritical drying process.

In addition, a method of preparing a nanostructured catalyst via a flame synthesis process instead of the liquid-phase process may be considered. However, the flame synthesis process is restricted in that the precursor supply speed is limited. As a result, catalyst production yield is low and mass production in commercial scale is difficult.

[Prior Patent Document 1] U.S. Pat. No. 4,871,709
[Prior Patent Document 2] Japanese Patent Publication No. S51-71299
[Prior Patent Document 3] Korean Patent No. 0589203

SUMMARY

The present disclosure is directed to providing an apparatus and a method for preparing a manganese oxide-titania catalyst with high decomposition efficiency of organic compounds, which allow mass production of the manganese oxide-titania catalyst by chemical vapor condensation (CVC) in gas phase through fewer and continuous processes.

In one aspect, there is provided an apparatus for preparing a manganese oxide-titania catalyst, including: a vaporizer vaporizing a manganese precursor and a titanium precursor; a carrier gas supply line supplying a carrier gas, which carries precursor vapors vaporized by the vaporizer to a reactor, to the vaporizer; an oxygen supply line supplying an oxygen source to the reactor; the reactor reacting the precursor vapors with the oxygen source to synthesize a manganese oxide-titania catalyst; and a collector condensing and collecting the manganese oxide-titania catalyst synthesized in the reactor.

The vaporizer may include a bubbler wherein the manganese precursor and the titanium precursor are vaporized; and a heat supply means supplying heat to the bubbler. The heat supply means may be an oil bath containing warmed oil.

Specifically, the reactor may include a tubular reactor, and the tubular reactor may be selected from an alumina tube, a quartz tube and a mullite tube.

The collector may include a cooler, and the cooler may include: a catalyst flow channel through which the manganese oxide-titania catalyst from the reactor passes; and a cooling fluid flow channel through which a cooling fluid for condensing the manganese oxide-titania catalyst passes.

In another aspect, there is provided a method for preparing a manganese oxide-titania catalyst, including: 1) vaporizing a manganese precursor and a titanium precursor; 2) carrying precursor vapors (vapors of the manganese precursor and the titanium precursor) and an oxygen source to a reactor; 3) reacting the precursor vapors and the oxygen source to synthesize a manganese oxide-titania catalyst; and 4) condensing and collecting the manganese oxide-titania catalyst.

The vaporizing may be performed by heating the precursors (the manganese precursor and the titanium precursor) to 80-110° C. And, the carrying may include: (a) carrying the precursor vapors to the reactor using a carrier gas; and (b) carrying the oxygen source to the reactor. The reaction may be performed at 700-1300° C.

BRIEF DESCRIPTION OF THE DRAWINGS

The above and other aspects, features and advantages of the disclosed exemplary embodiments will be more apparent from the following detailed description taken in conjunction with the accompanying drawings in which.

Figure 1:
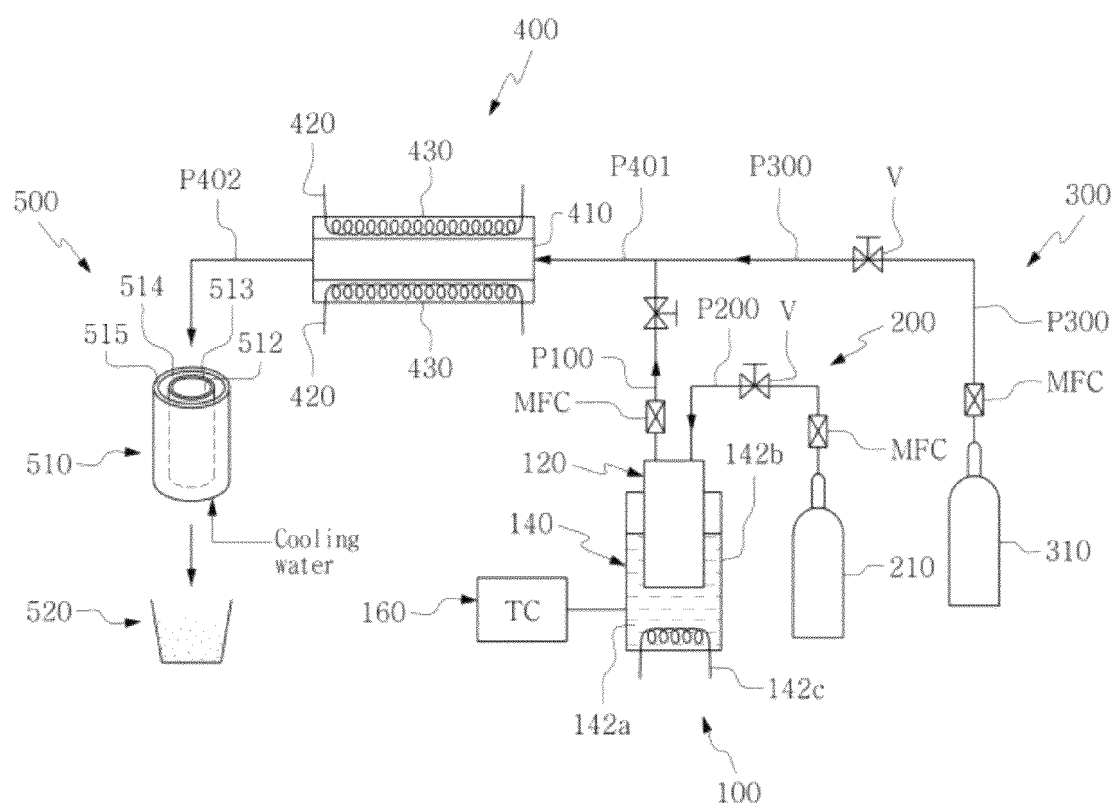
FIG. 1 shows a configuration of an apparatus for preparing a manganese oxide-titania catalyst according to an embodiment of the present disclosure.

| [Detailed Description of Main Elements] | |
|---|---|
| 100: vaporizer | 120: bubbler |
| 140: heat supply means | 200: carrier gas supply line |
| 210, 310: bombe | 300: oxygen supply line |
| 400: reactor | 410: tubular reactor |
| 420: heat supply means | 500: collector |
| 510: cooler | 520: collection tank |
| MFC: mass flow controller | |

DETAILED DESCRIPTION

Exemplary embodiments now will be described more fully hereinafter with reference to the accompanying drawings, in which exemplary embodiments are shown. the present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

The attached drawings show exemplary embodiments of the present disclosure. FIG. 1 shows a configuration of an apparatus for preparing a manganese oxide-titania catalyst according to an embodiment of the present disclosure, FIG. 2 shows a configuration of an apparatus for preparing a manganese oxide-titania catalyst according to another embodiment of the present disclosure, and FIG. 3 shows a configuration of an apparatus for preparing a manganese oxide-titania catalyst according to another embodiment of the present disclosure.

In the following description of the present disclosure, configuration of an apparatus for preparing a manganese oxide-titania catalyst (hereinafter, simply 'catalyst preparation apparatus') according to the present disclosure will be described first, and specific operations of the components of the catalyst preparation apparatus and effects thereof will be described in association with a method for preparing a manganese oxide-titania catalyst (hereinafter, simply 'catalyst preparation method') according to the present disclosure.

Figure 2:
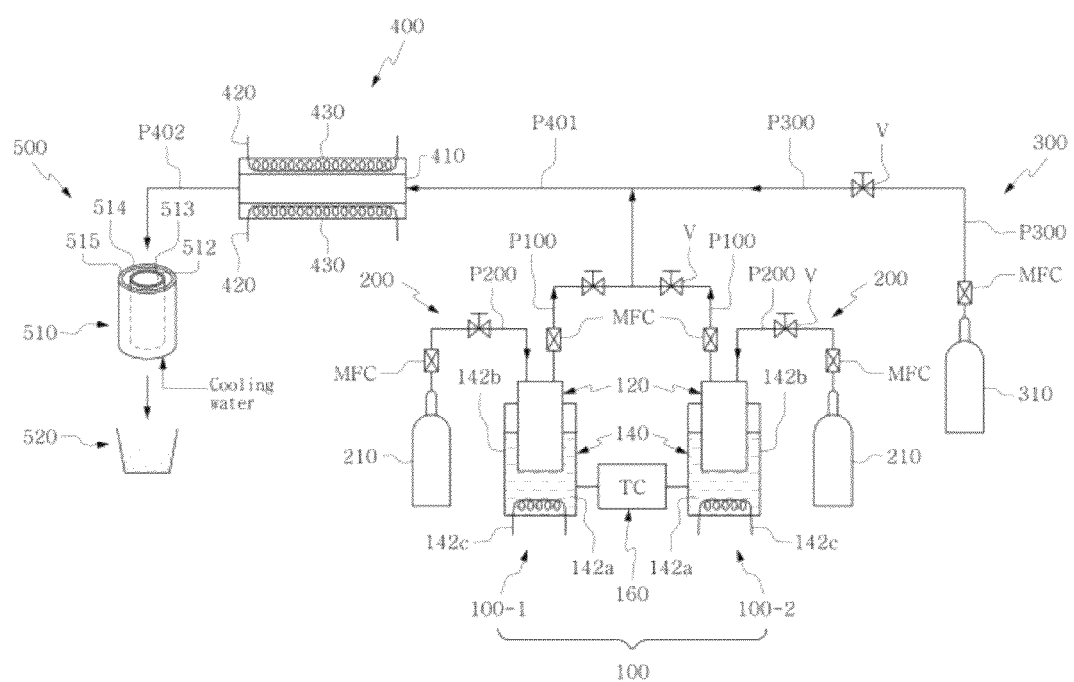
FIG. 2 shows a configuration of an apparatus for preparing a manganese oxide-titania catalyst according to another embodiment of the present disclosure.
Figure 3:
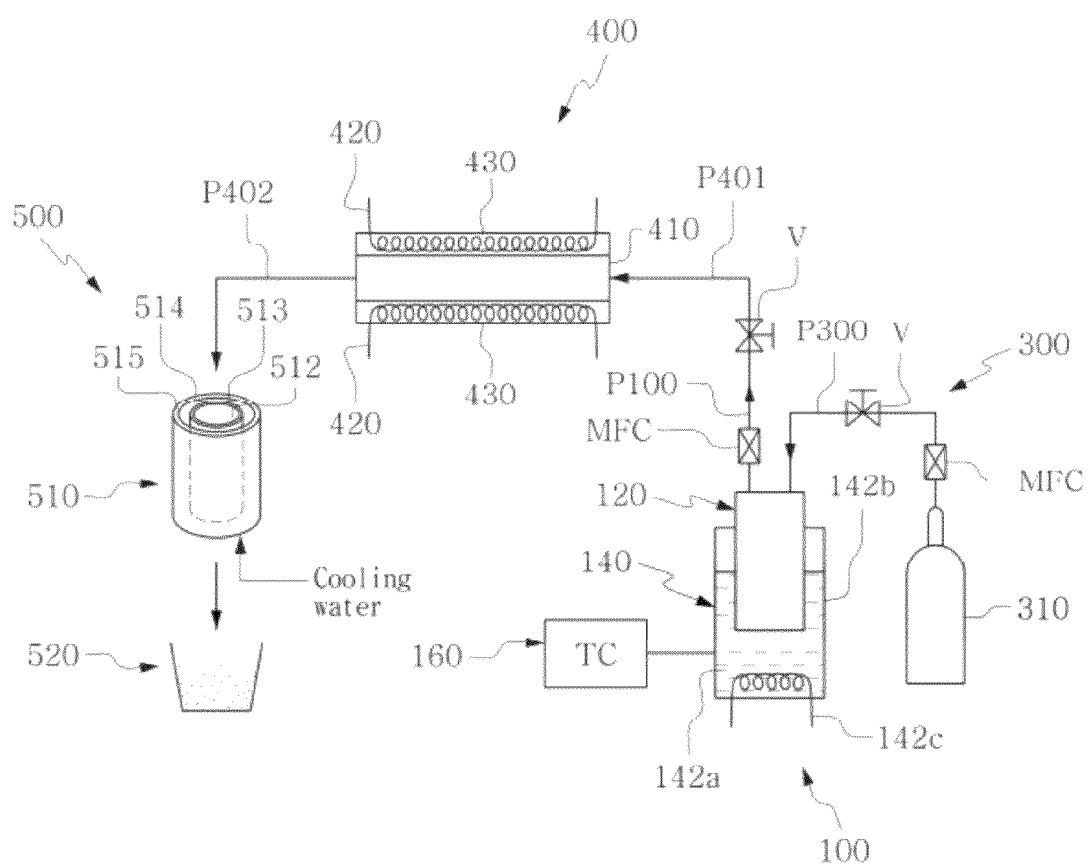
FIG. 3 shows a configuration of an apparatus for preparing a manganese oxide-titania catalyst according to another embodiment of the present disclosure.

First, referring to FIG. 1 and FIG. 2, a catalyst preparation apparatus according to the present disclosure comprises a vaporizer 100, a carrier gas supply line 200, an oxygen supply line 300, a reactor 400 and a collector 500.

The vaporizer 100 vaporizes a manganese precursor and a titanium precursor, which are the source (starting materials) for the synthesis of a manganese oxide-titania catalyst. Specifically, the precursors (the manganese precursor and the titanium precursor) are vaporized by a heat source of the vaporizer 100. The temperature of the heat source provided by the vaporizer 100 is not particularly limited as long as the precursors can be boiled.

In an exemplary embodiment of the present disclosure, the vaporizer 100 comprises: a bubbler 120 wherein the manganese precursor and the titanium precursor are vaporized; and a heat supply means 140 supplying heat to the bubbler 120. The bubbler 120 may be designed in various forms. For example, the bubbler 120 may have a cylindrical or prismatic shape, and may have multistage plates inside thereof.

The heat supply means 140 is not particularly limited as long as it may supply heat to the bubbler 120. For example, it may be selected from a heating wire or a band heater that produces heat by receiving an electrical power. The heat supply means 140 may be wound around the outer periphery of the bubbler 120. Alternatively, the heat supply means 140 may be equipped inside the bubbler 120. The heat supply means 140 may be, specifically, an oil bath 142. The oil bath 142 comprises a bath main body 142b containing oil 142a and a heating means 142c heating the oil 142a. The heating means 142c may be a heating wire as shown in FIG. 1. When heat is supplied to the bubbler 120 using the oil bath 142, abrupt warming may be prevented and the heat may be supplied uniformly to the bubbler 120. As illustrated in FIG. 1, the bubbler 120 may be provided in the bath main body 142b with at least a lower portion thereof being immersed in the warmed oil 142a.

The vaporizer 100 may further comprise a temperature controller 160. The temperature controller 160 controls the heat supply means 140 such that adequate heat is applied to the bubbler 120. For example, the temperature of the bubbler 120 may be controlled by the temperature controller 160 at 80-110° C.

The vaporizer 100 may be provided in the apparatus in singular or in plural. FIG. 1 shows an example wherein one vaporizer 100 is provided in the catalyst preparation apparatus according to the present disclosure, and FIG. 2 shows an example wherein two vaporizers 100 are provided in the catalyst preparation apparatus according to the present disclosure. If one vaporizer 100 is provided as in FIG. 1, a mixture of the manganese precursor and the titanium precursor is contained in the vaporizer 100. And, if two vaporizers 100 are provided as in FIG. 2, the manganese precursor and the titanium precursor may be held separately. Specifically, the vaporizer 100 may comprise: a manganese precursor vaporizer 100-1 vaporizing the manganese precursor; and a titanium precursor vaporizer 100-2 vaporizing the titanium precursor. As illustrated in FIG. 2, each of the vaporizers 100-1, 100-2 may comprise: a bubbler 120 wherein each precursor is vaporized; and a heat supply means 140 supplying heat to the bubbler 120.

The precursor vapors produced by the vaporizer 100 is carried to the reactor 400 through a carriage pipe P100. The carriage pipe P100 may be equipped with a warming or heating means. For example, the outer periphery of the carriage pipe P100 may be covered with a warming means such as a warming insulator, or wound with a heating means such as a heating wire or a band heater. The warming means or heating means may prevent the precursor vapors produced by the vaporizer 100 from being condensed while they are carried to the reactor 400.

The vaporizer 100 may further comprise a mass flow controller MFC. The mass flow controller MFC controls the flow volume of the precursor vapors carried and supplied to the reactor 400. The mass flow controller MFC may be equipped, for example, on the carriage pipe P100.

The carrier gas supply line 200 supplies a carrier gas to the vaporizer 100. The carrier gas serves as a carrier to carry and supply the precursor vapors (the vapors of the manganese precursor and the titanium precursor) vaporized by the vaporizer 100 to the reactor 400. Specifically, the precursor vapors produced by the vaporizer 100 are carried and supplied to the reactor 400 by the carrier gas through the carriage pipe P100.

The carrier gas supply line 200 comprises: a bombe 210 wherein the carrier gas is stored; and an injection pipe P200 providing a flow channel for carrying and supplying the carrier gas stored in the bombe 210 to the vaporizer 100. One end of the injection pipe P200 is connected to the bombe 210 and the other end is connected to the bubbler 120 of the vaporizer 100. In the bombe 210, a carrier gas selected from argon (Ar), nitrogen ($N_2$), helium (He), oxygen ($O_2$), air and a mixture thereof may be filled, without being limited thereto. In addition, the carrier gas supply line 200 may further comprise a mass flow controller MFC controlling the injection flow volume of the carrier gas. The mass flow controller MFC may be equipped on the injection pipe P200.

The carrier gas may be heated to be kept at an appropriate temperature. If the carrier gas is supplied to the vaporizer 100 at a low temperature, the precursor vapors may be condensed in the vaporizer 100, forming liquid mist. Thus, the carrier gas may be kept at a temperature almost the same as that of the precursor vapors in the vaporizer 100. Specifically, the carrier gas may be supplied to the vaporizer 100, at a temperature of 80-110° C. For this, the carrier gas supply line 200 may further comprises a warming or heating means. For example, the warming or heating means may be equipped at the bombe 210. Specifically, the warming or heating means may be equipped at the injection pipe P200 through which the carrier gas passes. As described earlier, the warming or heating means may be selected from a warming insulator, a heating wire, a band heater, or the like.

The oxygen supply line 300 supplies an oxygen source as an oxidizing agent to the reactor 400. The oxygen supply line 300 comprises: a bombe 310 wherein the oxygen source is stored; and a supply pipe P300 providing a flow channel for carrying and supplying the oxygen source stored in the bombe 310 to the reactor 400. As shown in the figures, one end of the supply pipe P300 may be connected to the bombe 310, and the other end may be joined with the carriage pipe P100 connected to the vaporizer 100. In the bombe 310, an oxygen source selected from oxygen ($O_2$), air and a mixture thereof may be filled. Specifically, compressed air may be filled therein. In addition, the oxygen supply line 300 may further comprise a mass flow controller MFC controlling the supply flow volume of the oxygen source. The mass flow controller MFC may be equipped on the supply pipe P300.

The oxygen source may be heated to be kept at an appropriate temperature.

If the oxygen source is supplied to the reactor 400 at a low temperature, the precursor vapors supplied from the vaporizer 100 may be condensed upon contact with the oxygen source. Thus, the oxygen source may be kept at a temperature almost the same as that of the precursor vapors in the vaporizer 100. Specifically, the oxygen source may be supplied to the reactor 400, at a temperature of 80-110° C. For this, the oxygen supply line 300 may further comprises a warming or heating means. For example, the warming or heating means may be equipped at the bombe 310. Specifically, the warming or heating means may be equipped at the supply pipe P300 through which the oxygen source passes. As described earlier, the warming or heating means may be selected from a warming insulator, a heating wire, a band heater, or the like.

The reactor 400 reacts the precursor vapors with the oxygen source to synthesize a manganese oxide-titania catalyst. The reactor 400 is maintained at a high temperature so as to synthesize the catalyst. Specifically, the reactor 400 may be maintained at 800-1300° C. during the introduction of the reactants. An electric furnace utilizing electric energy may be used to maintain the reactor 400 at a high temperature. In a specific embodiment, the reactor 400 comprises: a tubular reactor 410 as a continuous flow reactor; and a heat supply means 420 supplying heat to the tubular reactor 410.

The tubular reactor 410 may be made of metal or ceramic material. Specifically, the tubular reactor 410 may be selected from an alumina tube, a quartz tube or a mullite tube, made of ceramic material. More specifically, an alumina tube may be used. The tubular reactor 410 may have an outer diameter of 20-200 mm, an inner diameter of 15-180 mm and a length of 20 mm to 100 cm, without being limited thereto.

The heat supply means 420 may be formed on the outer periphery of the tubular reactor 410. For example, the heat supply means 420 may be selected from a heating wire or a band heater that produces heat by receiving an electrical power. The heat supply means 420 may be provided in singular or in plural linearly or spirally along the length direction of the tubular reactor 410. Also, as illustrated in the figures, the heat supply means 420 may be buried in a thermally conductive sheath 430. In addition, the heat supply means 420 may be provided inside the tubular reactor 410.

The reactor 400 may further comprise a temperature controller (not shown). The temperature controller controls the heat supply means 420 to maintain the temperature inside the tubular reactor 410 at an adequate high temperature. For example, the temperature inside the tubular reactor 410 may be maintained at 800-1300° C. In addition, the reactor 400 may further comprise a depressurizing chamber (not shown) so as to maintain the pressure inside the tubular reactor 410 vacuum which is below normal pressure.

An inflow pipe P401 may be connected to an inlet side of the reactor 400 and a discharge pipe P402 may be connected to an outlet side. The discharge pipe P402 is communicated with the collector 500. As shown in the figures, the inflow pipe P401 be joined with the carriage pipe P100 through which the precursor vapors are carried and the supply pipe P300 through which the oxygen source is supplied. The inflow pipe P401 may be equipped with a warming or heating means so as to prevent condensation of the precursor vapors. As described earlier, the warming or heating means may be selected from a warming insulator, a heating wire, a band heater, or the like.

The collector 500 condenses and collects the manganese oxide-titania catalyst synthesized at the reactor 400. In the collector 500, the synthesized manganese oxide-titania catalyst at high temperature is cooled rapidly and collected as particles. The collector 500 comprises at least a cooler 510 for cooling the manganese oxide-titania catalyst at high temperature. Further, the collector 500 may comprise a collection tank 520 for collecting the condensed catalyst particles. The cooler 510 of the collector 500 may be configured as a water-cooled thermophoretic plate to rapidly cool the catalyst. However, with increased collection cycles, collection efficiency may decrease and a lot of collection time may be required as the surface temperature of the thermophoretic plate increases. Accordingly, the cooler 510 may be configured as follows.

Referring to the figures, the cooler 510 of the collector 500 may comprise two flow channels 512, 514. Specifically, the cooler 510 may comprise a catalyst flow channel 512 and a cooling fluid flow channel 514. Through the catalyst flow channel 512, the manganese oxide-titania catalyst at high temperature introduced from the reactor 400 through the discharge pipe P402 passes, and through the cooling fluid flow channel 514, a cooling fluid for condensing the manganese oxide-titania catalyst at high temperature high. The cooler 510 having such a structure may be configured variously. For example, the cooler 510 may be configured as double pipes. Specifically, the cooler 510 may comprise an inner pipe 513 having the catalyst flow channel 512 and an outer pipe 515 formed outside the inner pipe 513 and having the cooling fluid flow channel 514. Such a double-pipe cooler 510 may improve collection efficiency and reduce collection time through continuous flow of the cooling fluid.

Referring to FIG. 3, in another embodiment of the present disclosure, a catalyst preparation apparatus may comprise a vaporizer 100, an oxygen supply line 300, a reactor 400 and a collector 500. Precursor vapors vaporized by the vaporizer 100 may be carried to the reactor 400 by an oxygen source supplied from the oxygen supply line 300. Specifically, the precursor vapors may be carried and supplied to the reactor 400 by the oxygen source without using a carrier gas. The oxygen source may be selected from oxygen ($O_2$), air or a mixture thereof. Specifically, air such as compressed air may be used.

The oxygen supply line 300 comprises: a bombe 310 wherein the oxygen source is stored; and a supply pipe P300 providing a flow channel for the oxygen source stored in the bombe 310. As shown in FIG. 3, one end of the supply pipe P300 is connected to the bombe 310, and the other end is connected to the vaporizer 100. Specifically, the discharge side of the supply pipe P300 is connected to a bubbler 120 of the vaporizer 100. Thus, the precursor vapors vaporized in the bubbler 120 is carried by the oxygen source (e.g., compressed air) supplied from the oxygen supply line 300 and is supplied to the reactor 400 along with the oxygen source.

With the afore-described catalyst preparation apparatus according to the present disclosure, manganese and titanium precursors are vaporized at high temperature and then condensed by cooling to prepare a nanosized manganese oxide-titania catalyst through a continuous process. Thus, the catalyst may be produced in large scale. In FIGS. 1 to 3, the undescribed symbol V represents a valve controlling the flow through each pipe. The catalyst preparation apparatus according to the present disclosure may be utilized usefully in a catalyst preparation method according to the present disclosure, which will be described hereinafter.

A catalyst preparation method according to the present disclosure comprises: 1) a vaporization step, 2) a reactant carrying step, 3) a reaction step, and 4) a collection step. These steps occur continuously. The respective steps will be described below.

1) Vaporization Step

First, a manganese precursor and a titanium precursor, which are the source (starting materials) for the synthesis of a manganese oxide-titania catalyst, are vaporized. The vaporization step may be carried out in the vaporizer 100 of the aforedescribed preparation apparatus. Specifically, liquid (or solid) precursors (the manganese precursor and the titanium precursor) are put into the bubbler 120 of the vaporizer 100 and vaporized using the heat source of the vaporizer 100. As used herein, the vaporization includes not only complete transition of the liquid (or solid) precursors to a gas phase by the heat source of the vaporizer 100 but also atomization to an extent allowing boiling.

The precursors, i.e. the manganese precursor and the titanium precursor, may be vaporized (or atomized) independently or in admixture. For example, the manganese precursor and the titanium precursor may be vaporized in admixture using the apparatus shown in FIG. 1, or the manganese precursor and the titanium precursor may be vaporized separately using the apparatus shown in FIG. 2. When the precursors are vaporized separately using different vaporizers 100-1, 100-2, they may be carried and supplied to the reactor 400 through different pipes, or may be carried and supplied to the reactor 400 through the carriage pipe P100 in admixture, as illustrated in FIG. 2.

The manganese precursor is not particularly limited as long as it is a manganese (Mn)-containing compound. The manganese precursor may further contain an oxygen atom (O). For example, the manganese precursor may be one or more selected from a manganese salt, an organomanganese compound, or the like, but is not limited thereto. Examples of the manganese salt may include manganese chloride ($MnCl_2$), manganese nitrate ($Mn(NO_3)_2$), etc. And, the organomanganese compound may be one or more selected from a group consisting of manganese acetate, manganese acetylacetonate, manganese carbonyl and hydrates thereof. Specifically, manganese acetate ($Mn(CH_3COO)_2$) and a hydrate thereof ($Mn(CH_3COO)_2 \cdot 4H_2O$) may be used among them.

The titanium precursor is not particularly limited as long as it is a titanium (Ti)-containing compound. The titanium precursor may further contain an oxygen atom (O). For example, the titanium precursor may be one or more selected from a titanium salt and a titanium alkoxide, but is not limited thereto. Examples of the titanium salt may include titanium tetrachloride ($TiCl_4$), etc. Specifically, the titanium precursor may be a titanium alkoxide represented by the following formula:

$$Ti(OR)_4$$

where R is an alkyl group, and the four R's may be different from one another.

Specifically, the titanium precursor may be one or more titanium alkoxide(s) selected from a group consisting of titanium tetramethoxide, titanium tetraethoxide, titanium tetra-n-propoxide, titanium tetraisopropoxide and titanium tetra-n-butoxide. Specifically, titanium tetraisopropoxide (TTIP; $Ti[OCH(CH_3)_2]_4$) with the R's being isopropyl groups may be used among them.

In the vaporization step, the precursors, specifically organometal compounds (organomanganese compound and titanium alkoxide), are vaporized (or atomized) to vapor phase to ensure good reaction activity in the reactor 400. If the precursors are supplied to the reactor 400 at high temperature as liquid drops without being vaporized (or atomized), the yield (synthesis rate) of the manganese oxide-titania catalyst in the reactor 400 may be lowered and the resulting catalyst particles may have poor properties (e.g., particle size).

In the vaporization step, the precursors may be vaporized (or atomized) by heating to an adequate temperature depending on the particular kind and amount of the precursors. Although not intended to be limitative, the precursors may be may be vaporized (or atomized) by heating to 50-200° C. For example, if organometal compounds (organomanganese compound and titanium alkoxide) are used as the precursors, they may be vaporized by heating to 80-110° C. in consideration of their boiling points. That is to say, the temperature of the bubbler 120 may be maintained at 80-110° C. for the vaporization. If the temperature of the bubbler 120 is lower than 80° C., production of the precursor vapors may decrease, resulting in lower yield (synthesis rate) of the catalyst particles. And, if the temperature exceeds 110° C., the synthesized catalyst particles may have poor properties, e.g. too large catalyst particle size.

2) Reactant Carrying Step

The precursor vapors, i.e. the manganese precursor and the titanium precursor, vaporized in the vaporization step are carried and supplied to the reactor 400. At the same time, an oxygen source is carried and supplied to the reactor 400. The carriage of the precursor vapors may be performed using either a carrier gas or the oxygen source.

Specifically, the carrying step may comprise: (a) a precursor carrying step of carrying the precursor vapors to the reactor using a carrier gas; and (b) an oxygen source carrying step of carrying the oxygen source to the reactor. The precursor carrying step (a) and the oxygen source carrying step (b) may be performed at the same time. The carrying step may be carried out using the apparatus shown in FIG. 1 or FIG. 2. That is to say, the precursor vapors are carried to the reactor 400 by the carrier gas injected from the carrier gas supply line 200, and the oxygen source is carried and supplied to the reactor 400 by a discharge pressure from the oxygen supply line 300. In another embodiment, the precursor vapors may be carried and supplied to the reactor 400 by the oxygen source. Specifically, the precursor vapors may be carried and supplied to the reactor 400 by the oxygen source discharged from the oxygen supply line 300 using the apparatus shown in FIG. 3.

Specifically, the precursor vapors may be carried by the carrier gas using the apparatus shown in FIG. 1 or FIG. 2 to the reactor 400, separately from the oxygen source. In this case, the supply flow volume of the precursor vapors and the supply flow volume of the oxygen source may be controlled independently.

The carrier gas may be selected from argon (Ar), nitrogen ($N_2$), helium (He), oxygen ($O_2$), air and a mixture thereof, although not being limited thereto. Specifically, the carrier gas may be a non-reactive gas that does not react with the precursor vapors selected from, for example, argon (Ar), nitrogen ($N_2$), helium (He) and a mixture thereof. As described earlier, the carrier gas may be supplied after being filled in the bombe 210 of the carrier gas supply line 200. Also, as described earlier, the carrier gas may be maintained at 80-110° C. in order to prevent condensation of the precursor vapors.

The oxygen source acts as an oxidizing agent that reacts with the metals (Mn and Ti) to form oxides (manganese oxide and titania). As described earlier, the oxygen source may be one or more selected from oxygen ($O_2$) and air. Specifically, compressed air may be used.

Specifically, the ratio of the supply flow volume of the precursor vapors (the manganese precursor and the titanium precursor vapor) and the oxygen source supplied to the reactor 400 may be 1:2-20 (flow volume of the precursor vapors: flow volume of the oxygen source=1:2-20). If the supply flow volume of the oxygen source relative to that of the precursor vapor is less than 2 or larger than 20, the catalyst production yield may decrease because of decreased production of oxides (manganese oxide and titania). More specifically, the supply flow volume ratio of the precursor vapors to the oxygen source may be 1:5-15. Most specifically, it may be 1:10. For example, the flow rate of the precursor vapors (the manganese precursor and the titanium precursor vapor) to the reactor 400 may be set at 0.7 L/min, and the flow rate of the oxygen source may be set at 7.0 L/min. These supply flow volumes may be controlled by the mass flow controllers MFC provided at the vaporizer 100 and the oxygen supply line 300. Further, the flow volume of the precursor vapors may be controlled by the flow volume of the carrier gas.

The manganese precursor vapor and the titanium precursor vapor may be carried to the reactor 400 at a weight ratio of 1-20:80-99 (i.e., manganese precursor vapor:titanium precursor vapor=1-20:80-99 based on weight). If the content of the manganese precursor vapor is smaller than the aforesaid range, catalytic activity (e.g., decomposition efficiency of organic substances) may decrease. Otherwise, if the content of the titanium precursor vapor is smaller than the aforesaid range, fewer particles of titania are produced and the manganese oxide layer becomes thick, So adsorption efficiency and catalytic interaction provided by titania may decrease. More specifically, the manganese precursor vapor and the titanium precursor vapor may be carried to the reactor 400 at a weight ratio of 2-10:90-98. Most specifically, they may be carried to the reactor 400 at a weight ratio of 5.0:95.0. The weight ratio may be controlled by controlling the contents of the precursors supplied to the bubbler 120 of the vaporizer 100 in the vaporization step.

3) Reaction Step

The reactants supplied to the reactor 400, i.e. the precursor vapors (the manganese precursor and the titanium precursor vapor) supplied from the vaporizer 100 and the oxygen source supplied from the oxygen supply line 300 are synthesized to the manganese oxide-titania catalyst in the reactor 400 at high temperature. The reaction may be divided into two stages. That is to say, pyrolysis and synthesis occur at the same time in the reactor 400. First, the precursor vapors (the manganese precursor vapor and the titanium precursor vapor) are pyrolyzed by the high temperature. The pyrolyzed metal (manganese and titanium) vapors are oxidized by the oxygen source and converted into manganese oxide and titanium oxide (titania). At the same time, the manganese oxide and the titanium oxide (titania) are bound to each other to form a nanosized manganese oxide-titania catalyst. The synthesized manganese oxide-titania catalyst has a core-shell structure of manganese oxide coated on the surface of titania. The manganese oxide coated on the surface of titania may be specifically manganese dioxide ($MnO_2$).

In the reaction step, the reaction temperature may be 700-1300° C. Specifically, the reaction may be carried out for 1 second to several minutes, more specifically for 1 second to 3 minutes, while maintaining the temperature in the tubular reactor 410 at 700-1300° C. If the reaction temperature is below 700° C., catalyst production yield may decrease since the precursors are not easily pyrolyzed and the manganese oxide-titania catalyst is not crystallized (synthesized) well. And, if the reaction temperature exceeds 1300° C., catalyst performance may decrease since the titania is converted from the anatase phase to the rutile phase and the particle size increases. More specifically, the reaction temperature may be around 1000° C., where the anatase phase dominates, specifically at 950-1050° C.

In the reaction step, the reaction pressure may be from vacuum to normal pressure, although not being limited thereto. That is to say, the pressure inside the tubular reactor 410 may be from vacuum to normal pressure, specifically from $10^{-2}$ Torr to 760 Torr.

4) Collection Step

The manganese oxide-titania catalyst synthesized in the reaction step is condensed and recovered. The collection step may be carried out using the collector 500 of the preparation apparatus described above. The manganese oxide-titania catalyst at high temperature synthesized in the reaction step may be condensed and recovered using a water-cooled thermophoretic plate. However, as described earlier, it may be desired to be condensed and recovered through heat exchange using a cooling fluid.

Specifically, the cooler 510 comprising the two flow channels 512, 514 may be used in the collection step. The manganese oxide-titania catalyst at high temperature synthesized in the reaction step is passed through one flow channel 512, and a cooling fluid is passed through the other flow channel 514 to condense the catalyst.

The cooling fluid may be a fluid (gas or liquid) at a temperature lower than that of the hot manganese oxide-titania catalyst introduced from the reactor 400. The cooling fluid may cool the manganese oxide-titania catalyst synthesized in the reaction step to a temperature of 100° C. or lower, although not being limited thereto. Specifically, the cooling fluid may be selected from cooling water at 25° C. or lower and liquid nitrogen. Specifically, the flow direction of the catalyst may be opposite to that of the cooling fluid. For example, as shown in the drawings, the cooling fluid (cooling water) may flow upward and the catalyst may flow downward.

The catalyst particles condensed by the cooler 510 may be recovered by filtering with a filter member (not shown). The filter member may be equipped, for example, at the cooler 510 or at the collection tank 520.

The organic substances produced during the reaction step, specifically the organic substances in gas phase produced from the pyrolysis of the manganese precursor and the titanium precursor, may be liquefied by the cooler 510 and then separated and removed along with non-reactive gases such as the carrier gas.

Since the catalyst preparation method described above involves fewer continuous processes, the catalyst may be produced in large scale and the decomposition efficiency of organic compounds is high. Further, the manganese oxide-titania catalyst prepared in accordance with the present disclosure has a smaller, nano-scale particle size as compared to the catalyst prepared according to the existing wet method. Thus, the catalyst prepared in accordance with the present disclosure has a large specific surface area and, thus, improved catalytic activity and superior decomposition efficiency. Although not being limited thereto, the manganese oxide-titania catalyst may have a particle size of 1 to 20 nm.

The manganese oxide-titania catalyst prepared in accordance with the present disclosure may be usefully used to decompose organic compounds. For example, it may be effectively used to decompose organic compounds produced in industrial facilities preparing and using organic solvents, coating facilities, combustion facilities, printing plants, paint industry, laundries, automobile-related facilities, gas stations, or the like, particularly chlorinated organic compounds or volatile organic compounds (VOCs).

EXAMPLES

The examples and experiments will now be described. The following examples and experiments are for illustrative purposes only and not intended to limit the scope of the present disclosure.

Example

Manganese acetate ($Mn(CH_3COO)_2$) was added to a solution of titanium tetraisopropoxide (TTIP; $Ti[OCH(CH_3)_2]_4$) in an amount of 5.0 wt % based on the weight of the total precursors. Then, after adding the resulting precursor mixture to a bubbler, which is immersed in an oil bath, of the apparatus shown in FIG. 1, the precursor mixture was vaporized while maintaining the temperature of the bubbler at 95° C. Then, the vaporized precursor mixture was carried to an alumina tube of an electric furnace using argon (Ar) gas. Also, compressed air was supplied to the alumina tube.

The argon gas and the compressed air were supplied to the alumina tube at a flow rate of 0.7 L/min and 7.0 L/min, respectively. The temperature in the alumina tube was maintained at 900° C. such that a manganese oxide-titania catalyst having a core-shell structure with manganese dioxide ($MnO_2$) coated on the surface of titania ($TiO_2$) was synthesized in gas phase. Then, catalyst particles were condensed and recovered with 2-hour cycles by cooling the prepared catalyst to 50° C. using a double-pipe collector through which cooling water flows.

Figure 4:
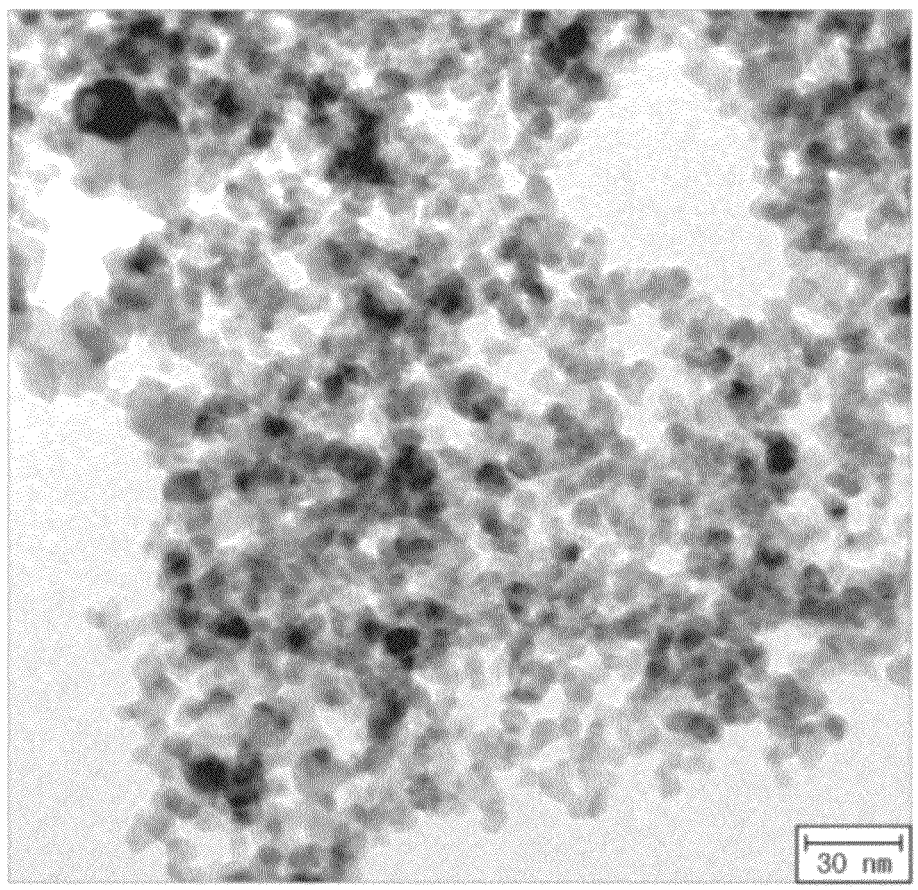
FIG. 4 shows a transmission electron microscopic (TEM) image of a manganese oxide-titania catalyst prepared according to an embodiment of the present disclosure.

FIG. 4 shows a transmission electron microscopic (TEM) image of the prepared manganese oxide-titania catalyst.

Comparative Example

A catalyst was prepared to the wet method (impregnation method), which is commonly used to prepare catalysts. Manganese acetate and an acid were uniformly dissolved in water and then impregnated in commercial titania (Degussa, P-25) powder. The content of manganese acetate was 5.0 wt % based on the weight of the total precursors. Thereafter, the catalyst was prepared through evaporation and drying.

Figure 5:
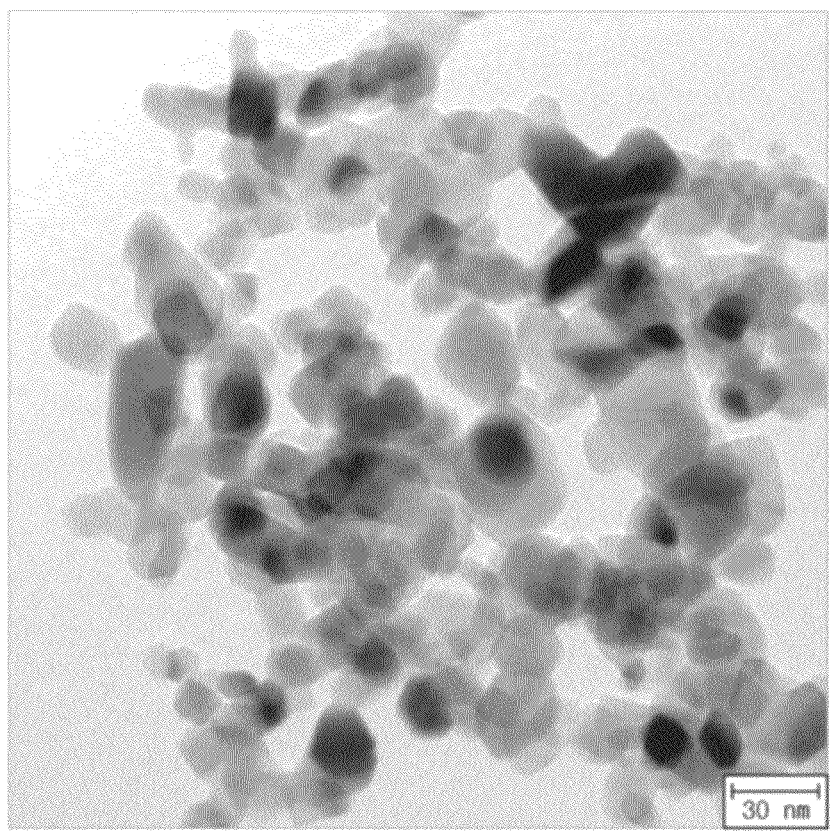
FIG. 5 shows a TEM image of a manganese oxide-titania catalyst prepared according to the related art (wet method)

FIG. 5 shows a TEM image of the prepared manganese oxide-titania catalyst.

<Decomposition Efficiency of Organic Compounds>

In order to evaluate the activity of the manganese oxide-titania catalysts prepared in the examples, decomposition efficiency (selectivity) was investigated for toluene ($C_7H_8$) as a representative volatile organic compound (VOC), as follows.

The manganese oxide-titania catalyst prepared in Example (5.0 g) packed in a fixed-bed reactor and reactivity was monitored at temperatures from 25° C. to 100° C. with 25° C. intervals, for a reaction time of 2 hours. After injecting toluene (50 ppm) to the reactor, the injected toluene was passed through the catalyst layer at a space velocity of 20,000 $h^{-1}$ using compressed air.

Then, selectivity for $CO_x$ was evaluated in order to measure the decomposition efficiency of toluene. Concentrations of the reactant (toluene) and products (CO and $CO_2$) at the inlet (upper portion) and the outlet (lower portion) of the catalyst layer were analyzed by FT-IR. Selectivity for $CO_x$ at different temperatures is shown in FIG. 6.

The selectivity for $CO_x$ at different temperatures was also evaluated for the catalyst prepared according to the wet method (impregnation method) in Comparative Example. The result is also shown in FIG. 6.

Figure 6:
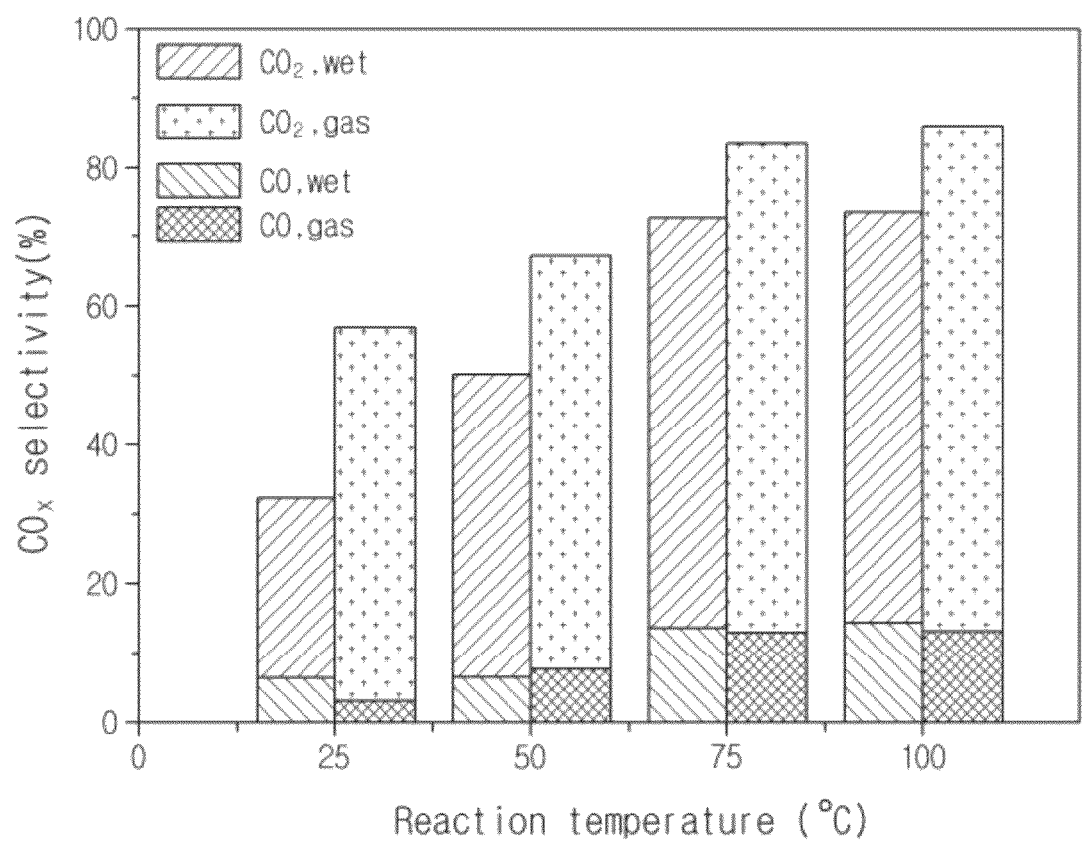
FIG. 6 shows a result of toluene decomposition test using a manganese oxide-titania catalyst prepared according to an embodiment of the present disclosure.

In FIG. 6, the result for the manganese oxide-titania catalyst prepared in Example according to the present disclosure (gas-phase synthesis) was denoted as "gas", and the result for the catalyst prepared in Comparative Example (wet method) was denoted as "wet".

First, as shown in FIG. 4 and FIG. 5, the catalyst synthesized in gas phase according to the present disclosure in Example has more uniform particle size distribution and smaller nano-scale size, as compared to the catalyst prepared according to the wet method (impregnation method) in Comparative Example. That is to say, whereas the catalyst prepared according to the wet method (impregnation method) in Comparative Example has a particle size of about 8-40 nm, as seen from FIG. 5, the catalyst prepared according to the present disclosure in Example has a smaller particle size of about 3-8 nm as well as a uniform particle size distribution.

When evaluating the performance of a catalyst of decomposing organic compounds (including VOCs), it is important how much it oxidizes the organic compounds and converts them into CO, $CO_2$, or the like. The sum of the concentrations of CO and $CO_2$ produced as a result of the decomposition (oxidation) is the oxidization removal rate of the catalyst. FIG. 6 shows the oxidization removal rate (selectivity).

As seen from FIG. 6, the catalyst synthesized in gas phase according to the present disclosure in Example ("gas" in FIG. 6) exhibits better oxidization removal rate in all temperature ranges than the catalyst prepared according to the wet method in Comparative Example ("wet" in FIG. 6). In other words, the catalyst of the present disclosure prepared in Example resulted in a larger sum of the concentrations of CO and $CO_2$ than that of Comparative Example, meaning higher decomposition efficiency of organic compounds (including VOCs).

According to the present disclosure, the manganese oxide-titania catalyst can be prepared in large scale through fewer and continuous processes. Further, the manganese oxide-titania catalyst has high decomposition efficiency of organic compounds since it has a large specific surface area.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A method for preparing a manganese oxide-titania catalyst, comprising:
    vaporizing a manganese precursor and a titanium precursor by heating the precursors (the manganese precursor and the titanium precursor) to 80-110° C.;
    carrying precursor vapors (vapors of the manganese precursor and the titanium precursor) and an oxygen source to a reactor;
    reacting the precursor vapors and the oxygen source to synthesize a manganese oxide-titania catalyst; and
    condensing and collecting the manganese oxide-titania catalyst.

2. The method for preparing a manganese oxide-titania catalyst according to claim 1, wherein the manganese precursor is one or more selected from a group consisting of a manganese salt and an organomanganese compound.

3. The method for preparing a manganese oxide-titania catalyst according to claim 1, wherein the manganese precursor is one or more selected from a group consisting of manganese acetate, manganese acetylacetonate, manganese carbonyl and hydrates thereof.

4. The method for preparing a manganese oxide-titania catalyst according to claim 1, wherein the titanium precursor is one or more selected from a group consisting of a titanium salt and a titanium alkoxide.

5. The method for preparing a manganese oxide-titania catalyst according to claim 1, wherein the titanium precursor is one or more selected from a group consisting of titanium tetramethoxide, titanium tetraethoxide, titanium tetra-n-propoxide, titanium tetraisopropoxide and titanium tetra-n-butoxide.

6. The method for preparing a manganese oxide-titania catalyst according to claim 1, wherein said carrying comprises: carrying the precursor vapors to the reactor using a carrier gas; and carrying the oxygen source to the reactor.

7. The method for preparing a manganese oxide-titania catalyst according to claim 6, wherein the carrier gas is one or more selected from a group consisting of argon (Ar) and nitrogen (N2).

8. The method for preparing a manganese oxide-titania catalyst according to claim 6, wherein the temperature of the carrier gas is 80-110° C.

9. The method for preparing a manganese oxide-titania catalyst according to claim 1, wherein said carrying comprises carrying the precursor vapors with the oxygen source to the reactor using the oxygen source.

10. The method for preparing a manganese oxide-titania catalyst according to claim 6, wherein the carrier gas is a non-reactive gas that does not react with the precursor vapors.

11. The method for preparing a manganese oxide-titania catalyst according to claim 1, wherein the oxygen source is one or more selected from a group consisting of oxygen (O2) and air.

12. The method for preparing a manganese oxide-titania catalyst according to claim 1, wherein said carrying comprises carrying the precursor vapors and the oxygen source to the reactor at a flow volume ratio of 1:2-20.

13. The method for preparing a manganese oxide-titania catalyst according to claim 1, wherein said carrying comprises carrying the manganese precursor vapor and the titanium precursor vapor to the reactor at a weight ratio of 1-20:80-99.

14. The method for preparing a manganese oxide-titania catalyst according to claim 1 wherein the temperature of the oxygen source is 80-110° C.

15. The method for preparing a manganese oxide-titania catalyst according to claim 1, wherein the reaction temperature in said reacting is 700-1300° C.

16. The method for preparing a manganese oxide-titania catalyst according to claim 1, wherein the manganese oxide-titania catalyst synthesized in said reacting has a core-shell structure of manganese oxide coated on the surface of titania.

17. The method for preparing a manganese oxide-titania catalyst according to claim 1, wherein said condensing and collecting comprises, using a cooler having two flow channels, passing the manganese oxide-titania catalyst synthesized in said reacting through one of the flow channels and passing a cooling fluid through the other flow channel.

18. The method for preparing a manganese oxide-titania catalyst according to claim 17, wherein the cooling fluid is selected from a group consisting of cooling water and liquid nitrogen.

* * * * *